Figure 1:
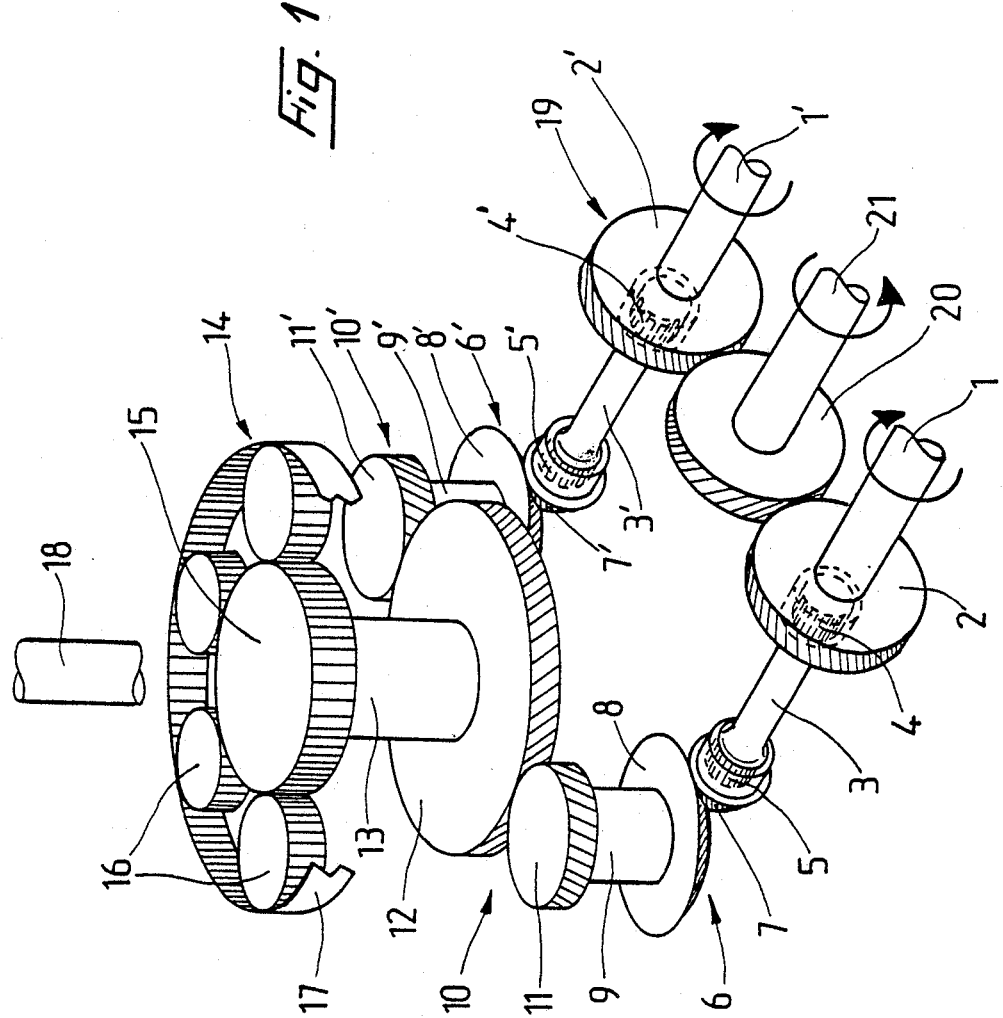

United States Patent [19]

Mouille

[11] Patent Number: 4,811,627

[45] Date of Patent: Mar. 14, 1989

[54] MAIN TRANSMISSION GEARBOX FOR A TWIN-ENGINED HELICOPTER

[75] Inventor: Rene L. Mouille, Aix-en-Provence, France

[73] Assignee: Aerospatiale Societe Nationale Industrielle, Paris, France

[21] Appl. No.: 758,248

[22] Filed: Jul. 24, 1985

[30] Foreign Application Priority Data

Aug. 6, 1984 [FR] France ................... 84 12400

[51] Int. Cl.$^4$ ............................................. F16H 37/06
[52] U.S. Cl. .................. 74/665 L; 74/665 E; 74/675
[58] Field of Search ............ 74/665 A, 665 B, 665 C, 74/665 D, 665 E, 665 L, 675, 705, 410

[56] References Cited

U.S. PATENT DOCUMENTS

| | | | |
|---|---|---|---|
| 3,129,608 | 4/1964 | Watson | 74/665 |
| 3,255,625 | 6/1966 | Mouille et al. | 74/665 L X |
| 3,545,296 | 12/1970 | Eggins | 74/410 |
| 3,564,937 | 2/1971 | Soloviev et al. | 74/665 A |
| 3,782,223 | 1/1974 | Watson | 74/665 L |
| 4,479,619 | 10/1984 | Saunders et al. | 74/665 E X |
| 4,489,625 | 12/1984 | White | 74/665 C |

FOREIGN PATENT DOCUMENTS 0091744 10/1983 European Pat. Off. .
2261179 9/1975 France .
814905 6/1959 United Kingdom ............... 74/410

Primary Examiner—Allan D. Herrmann
Assistant Examiner—Dirk Wright
Attorney, Agent, or Firm—Armstrong, Nikaido, Marmelstein & Kubovcik

[57] ABSTRACT

In a main transmission gearbox for a helicopter having two engines, a lifting rotor and an anti-torque rotor, each of the two engines drives a main kinematic chain comprising from upstream down, an input shaft, a twistable shaft, a gear train forming a first reduction stage having a first bevel pinion meshing with a second bevel pinion which drives in rotation a vertical shaft bearing having a third pinion in mesh with a gearwheel which is common to the two main chains and forms with the third pinions a second reduction stage. The torque received at the gearwheel is transmitted to the driving shaft of the main rotor by way of a supplementary reduction stage of epicyclic type. A third chain comprising two input pinions each of which is mounted upon one of the input shafts and an intermediate pinion which drives the driving shaft of the anti-torque rotor, ensures the distribution of power over the two main chains in the event of breakdown of one engine.

15 Claims, 2 Drawing Sheets

MAIN TRANSMISSION GEARBOX FOR A TWIN-ENGINED HELICOPTER

The present invention is concerned with main transmission gearboxes for twin-engined helicopters and it relates more precisely to a main transmission gearbox comprising two main kinematic chains connected each to a respective one of the engines and coupled at the output in order to summate the power delivered by the two engines and to transmit it to the main rotor shaft, directly to indirectly through one or more supplementary stages of reduction but likewise coupled at the input in such a way that in the event of engine failure the power delivered by the remaining engine boosted up to the maximum emergency power is shared between the two main kinematic chains.

The function fulfilled by a main helicopter transmission gearbox is to ensure the transmission of the power delivered by the engine or engines to the rotors which are usually one main or lifting rotor and one anti-torque or rear rotor of the helipcopter. The power from the engine or engines is introduced by way of shafts, in general very short ones, into the main transmission gearbox which exhibits the construction of a central reduction unit. The latter transmits the major portion of the total power which it receives to the main rotor and diverts a portion of the total power towards the anti-torque rotor by means of an auxiliary kinematic chain including gear trains, transmission shafts and at least one auxiliary transmission gearbox.

Certain twin-engined helicopters of recent design are equipped with main transmission gearboxes including in general three stages of reduction, one of which consists of a bevel gear train, the two others consisting of cylindrical gear trains. The last stage, called the output stage of the gearbox, always consists of a gear train having a high reduction ratio and comprising a central pinion of large diameter, likewise called the central gearwheel, which is directly integrated in rotation with the driving shaft of the lifting rotor and upon which is carried out the summation of the power delivered by the two engines.

In a main transmission gearbox exhibiting such a general construction the axis of the last pinion of the whole of the transmission chain, which is the central adding gearwheel, coincides with the axis of the lifting rotor. Such an arrangement lends itself favourably to the anchoring of the driving shaft of the lifting rotor on the bearings upon which the central adding gearwheel is mounted in rotation. This arrangement likewise allows a reduction in the height of the helicopter because customarily the output stage is arranged in a conical casing situated above the main transmission gearbox. Another advantage of such an arrangement is that the controls of the lifting rotor may be integrated into the main transmission gearbox because of the large dimension of the central adding gearwheel and for this same reason the passing of the possible ducts or conductors of large dimension the destination of which is the head of the lifting rotor, for example, those of a rotor mast sight, is greatly facilitated.

Such a construction presents, however, a major disadvantage for an aircraft such as a helicopter because it is greatly penalizing from a weight point of view. That is, when two engines are operating, the torque transmitted to the driving shaft of the lifting rotor passed through two pairs of teeth, whilst this torque passes through only one pair of teeth when only one engine is operating. The dimensioning of the teeth in order that they may withstand the corresponding loads, leads to the production and use of pinions of greater size in width and in thickness and hence of greater weight. Furthermore, it should be observed that the dimensioning of the teeth is the more unfavourable because in the case of flying on one engine, the other having failed, the pinions must transmit the maximum emergency power of the engine remaining in operation from the input to the main transmission gearbox, through which the latter is connected to the output shaft of the engine in operation, to the adding gearwheel. This maximum emergency power is in general about 50 to 60% higher than the maximum continuous power of each engine which is taken into consideration for operation on both engines.

For this reason new systems of transmission of torque between the engines of a helicopter and its rotors have already been proposed which enable a substantial portion of the excessive mass of the above mentioned constructions which is due to each of the kinematic chains of transmission connecting one of the engines to the adding gearwheel having to be dimensioned as a function of the maximum emergency power of this engine to be eliminated.

In particular the French Patent No. 2261179 describes such a transmission system for a twin-engined helicopter which comprises two main kinematic chains, each including gear trains and transmission shafts, one of which exhibits a certain flexibility in torsion, and each intended for transmitting the torque available at the output shaft from one of the two engines to a substantially vertical driving shaft of a helicopter lifting rotor, each main chain comprising an input stage including an input shaft coupled to the corresponding engine and driven from the latter by way of a freewheel and the output shaft of the engine and substantially aligned with the said output shaft of the engine, a first reduction stage consisting of a bevel gear train comprising a first bevel pinion driven from the input shaft and in mesh with a second bevel pinion integral with a first substantially vertical transmission shaft and a second reduction stage consisting of a cylindrical gear train comprising a terminal pinion integral with the first substantially vertical transmission shaft and in mesh with an adding gearwheel common to the two main chains and connected to the driving shaft of the lifting rotor, one auxiliary kinematic chain including at least one cylindrical pinion and a transmission shaft connected to the anti-torque rotor of the helicopter and intended for diverting a fraction of the torque delivered by one or both of the two engines towards the anti-torque rotor; and one fourth or coupling kinematic chain comprising a train of cylindrical gears and connecting the two main chains together so as to ensure in the event of stoppage and/or failure of a first engine the sharing of the torque delivered by the second engine still in operation between the main chain coupled to the latter and at least the second reduction stage of the main chain coupled to the first engine in order that the gearwheel may always be driven by both terminal pinions with which it is in mesh.

In accordance with the aforesaid French patent the gear train of the fourth chain comprises a common idler pinion mounted so as to turn about the bottom end of the driving shaft of the lifting rotor, and two cylindrical pinions which mesh with the idler pinion and are each integral in rotation with the top end of a rigid lower section of the substantially vertical transmission shaft of one of the two main kinematic transmission chains. Each of the cylindrical pinions is connected to the terminal pinion of the corresponding main chain, in mesh with the common adding gearwheel which is a common output pinion integral in rotation with the driving shaft of the main rotor, between the ends of this shaft, through an upper section of the corresponding substantially vertical transmission shaft, and this upper section of shaft is the shaft which exhibits a certain flexibility in torsion which the corresponding main kinematic chain includes.

In such a construction it is clear that the sharing of the engine-torque available is ensured by the idler pinion and the cylindrical pinions, between the two terminal pinions meshing with the common adding gearwheel so that in the event of breakdown of one engine the maximum emergency power delivered by the other engine is transmitted through the corresponding main kinematic chain as far as the input to the second reduction stage of this chain where the sharing is effected. For this reason each of the two main kinematic chains must be overdimensioned as far as the input to its second reduction stage, which limits the possiblities of lightening the mass of the main transmission gearbox.

Further, a supplementary pinion meshes with the idler pinion and is connected through a shaft which is flexible in torsion and extends vertically upwards to an associated pinion which meshes with the common adding gearwheel. At the same time the supplementary pinion is connected through a shaft extending vertically downwards, to a first pinion of a second bevel gear train the second pinion of which drives a substantially horizontal output shaft which forms the shaft for transmission of a fraction of the engine torque towards the anti-torque rotor. Consequently the auxiliary kinematic chain which comprises three transmission shafts, two pinions and a train of two bevel pinions is heavy and complicated.

According to the present invention there is provided a main transmission gearbox for a helicopter having a lifting rotor, an anti-torque rotor and two engines each of which has an output shaft, said gearbox comprising a vertical driving shaft for coupling to said lifting rotor, two main kinematic chains for coupling the respective engines to the vertical driving shaft, each main kinematic chain comprising an input stage having an input shaft arranged to be driven in rotation by the output shaft of the associated engine, a first reduction stage having a first transmission shaft driven in rotation by said input shaft, a first bevel pinion driven by said first transmission shaft, a second bevel pinion meshing with said first bevel pinion and a second transmission shaft driven by said second bevel pinion, and a second reduction stage including a third pinion driven by said second transmission shaft and a gearwheel which meshes with said third pinions of both of said main kinematic chains and which is coupled to said vertical driving shaft, and a third kinematic chain comprising a train of gears further coupling the two main kinematic chains together, said train of gear comprising an input pinion mounted on and for rotation with said input shaft of each main kinematic chain and at least one intermediate pinion disposed between and in geared connection with said input pinions to couple said input pinions together, each of said first transmission shafts extending between said first bevel pinion and said input pinion and being flexible in torsion.

In such a construction the addition of the powers of the two engines which is effected as in the aforesaid French patent at the level of the second reduction stage, is obtained by means of the interconnection of the two main kinematic chains which is ensured at the level of their input stage by the third chain so that in the event of operation on one engine the maximum emergency power from this engine is distributed over the two main chains from their input stage. Consequently, the dimensioning of the whole of each of the two main kinematic chains may be just sufficient for the transmission of the maximum continuous power or of the corresponding fraction of the maximum emergency power, which enables an important saving in mass to be achieved in the shafts, the pinions and the bearings employed in these kinematic chains as well as in the casing which houses them.

This advantage is the more marked in that the shafts which exhibit a certain flexibility in torsion, also called twistable shafts, are in accordance with the invention placed before the first reduction stage of the main kinematic chains and hence may be dimensioned for a lower torque than that which acts upon the twistable shafts of the construction described in the aforesaid French patent, since this torque is applied to shafts driven at a higher speed of rotation for one and the same speed of rotation of the output shafts from the engines to which the two main kinematic chains are coupled.

Again, the absence of the idler pinion arranged under the common adding gearwheel and mounted in rotation about the bottom end of the driving shaft of the lifting rotor, enables a main transmission gearbox to be constructed in accordance with the invention, which has a significantly smaller vertical bulk than that of the device forming the object of the aforesaid French patent.

It must likewise be observed that the means to drive the anti-torque rotor from the main transmission gearbox in accordance with the invention consists solely of one of the intermediate pinions of the gear train of the third chain which connects the input shafts of the main kinematic chains, and of one transmission shaft integral with said one intermediate pinion and extending towards the anti-torque rotor, this shaft being parallel with the input shafts to the main chains as well as with the output shafts from the engines because of the nature of the pinions of the third chain, so that this shaft extends in the substantially horizontal plane defined by the axes of the output shafts of the two engines, which is an arrangement which is very favourable to the extension of this shaft as far as the auxiliary transmission gearbox in the vicinity of the anti-torque rotor at the rear of the helicopter. Consequently, it is unnecessary to provide a pinion meshing with the common adding gearwheel and a bevel gear train, as is the case in the aforesaid French patent in order to drive the anti-torque rotor.

The two input pinions and the intermediate pinion or pinions of the third chain are advantageously pinions having helical teeth. The third chain may comprise either a single intermediate pinion meshing with each of the two input pinions to this chain and arranged substantially between them, or a number of intermediate pinions of which the one which forms the driving pinion of the transmission shaft to the anti-torque rotor is connected to at least one of the input pinions to the third chain by at least one other intermediate pinion to ensure the driving of at least one accessory such as an alternator, a hydraulic pump or a rotor brake. In the latter case which enables adaptation to a relatively large distance apart between the two input shafts, imposed, for example, by the overall diameter of the engines, it is advantageous if the third chain comprises an odd number of intermediate pinions of which the one which forms the driving pinion of the transmission shaft to the antitorque rotor is connected to each of the two input pinions to the third chain by an equal number of intermediate pinions which are in mesh with one another, in order to obtain a balanced construction with respect to the distribution of the masses and loads.

In the case where the engines are not of the type including a freewheel integrated with their output stage, each of the input shafts to the main transmission gearbox in accordance with the invention is advantageously coupled to the output shaft from the corresponding engine through a freewheel.

In the main transmission gearbox in accordance with the invention, because of the interconnection of the input stages of the two main kinematic chains, which is ensured by the pinions of the third chain, the group of the kinematic chains becomes hyperstatic. The flexibility which on the one hand is required by this hyperstatic group in order to achieve under satisfactory conditions the sharing of the power between the two main chains in the event of operation on only one engine, is provided by the twistable shafts, each of which connects one input pinion of the third chain, to the bevel pinion of the corresponding first reduction stage. But on the other hand it is necessary to ensure an adjustment of the pinions in order to obtain a simultaneous meshing contact between the teeth of the several kinematic chains of the group, by compensating for the play in mesh and the tolerances of manufacture. This is in part obtained by the fact that at least one but preferably each of the two transmission shafts flexible in torsion is equipped with splines at each end of it, the splines at one end exhibiting an angular offset with respect to those at the other end. In a simple embodiment the transmission shafts flexible in torsion include a number of splines formed at each of its ends which number is different at opposite ends.

With the same aim, at least one of the two helical-tooth input pinions to the third chain is adjustable by transmission along its axis in order to ensure simultaneity of meshing of the teeth on all of the pinions of the third chain.

In accordance with a first embodiment and as in the aforesaid French patent, the common adding gearwheel is integral in rotation with the driving shaft of the lifting rotor and exhibits helical teeth which co-operate with the teeth of the same nature on the first pinions.

However, in the case of helicopters of higher tonnage it may be of interest to interpose between the common adding gearwheel and the rotor shaft one or more stages of reduction in the form of epicyclic reduction gearing.

Figure 2:
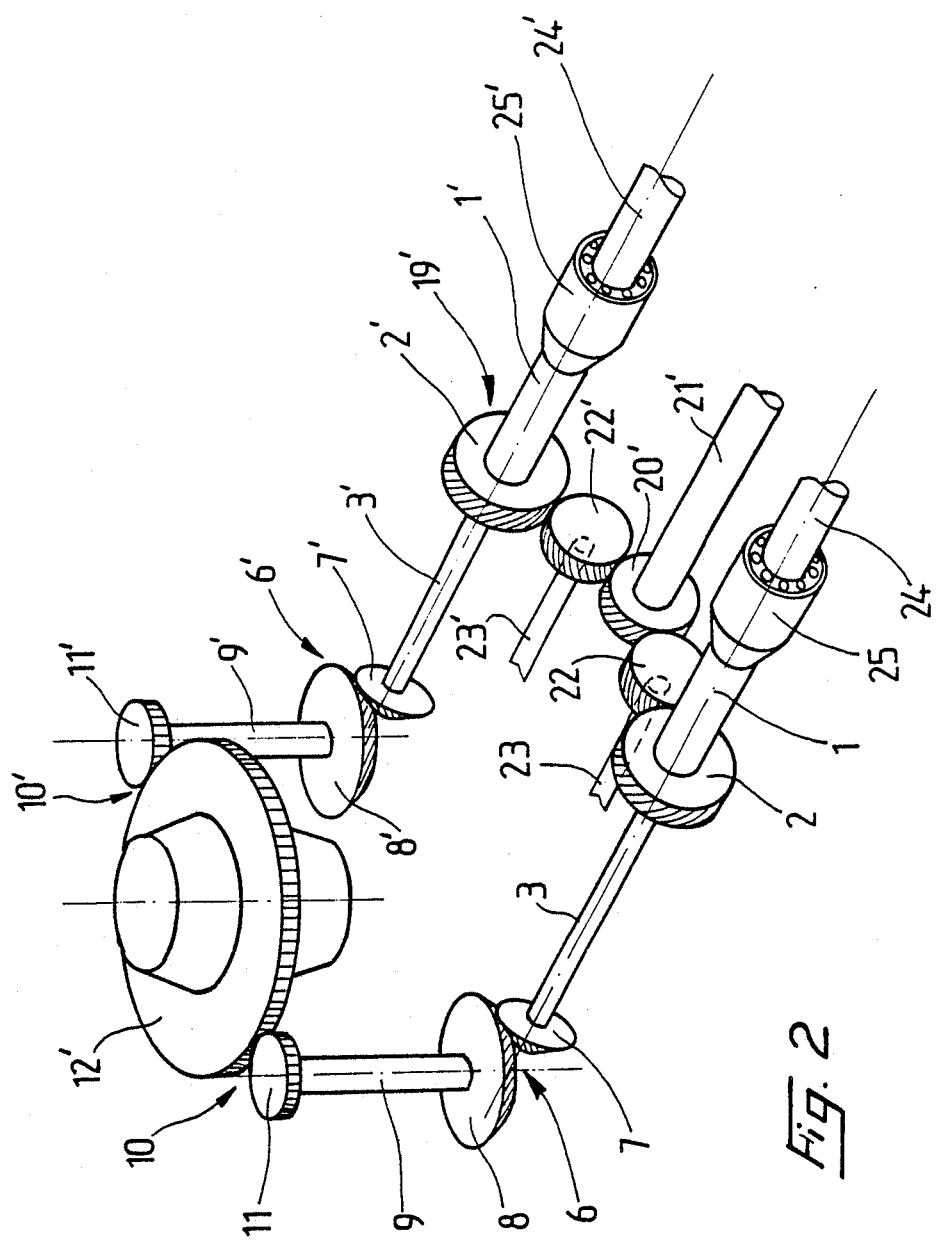

The invention will now be described in more detail by way of example. The description makes reference to the accompanying diagrammatic drawings in which:

FIG. 1 is a perspective view of one embodiment of a main transmission gearbox for twin-engined helicopter having three stages of reduction according to the invention, and FIG. 2 is a perspective view of another embodiment of a main transmission gearbox for a twin-engined helicopter having only two stages of reduction.

In FIG. 1 is shown a main transmission gearbox for a twin-engined helicopter equipped with two turbine units (not shown) arranged substantially side by side and each equipped with a freewheel on its output shaft, which output shafts are parallel with one another in one and the same horizontal plane and are parallel with the longitudinal axis of the helicopter.

Each engine drives a main kinematic chain the input stage of which comprises one horizontal input shaft 1 or 1', the lengthwise axis of which coincides with that of the output shaft from the engine to which the input shaft 1 or 1' is directly coupled. At its downstream end in the direction of transmission of the power, that is to say, at its end opposite from the engine, each input shaft 1 or 1' is integral with a cylindrical pinion 2 or 2' having helical teeth. The input stage of each kinematic chain further comprises a second transmission shaft 3 or 3' which is a shaft exhibiting a certain flexibility in torsion, called a twistable shaft during the course of the present document, and which is coaxial with the corresponding pinion 2 or 2' and with the input shaft 1 or 1'. At its upstream end each of the twistable shafts 3 and 3' is formed with a certain number of external splines 4 or 4' by which it is connected to internal splines of complementary shape formed in a short collar provided by the corresponding pinion 2 or 2' on its face remote from the corresponding input shaft 1 or 1'. At its downstream end each twistable shaft 3 or 3' is formed with a different number of external splines 5 or 5' by which it is connected to internal splines of complementary shape formed in a short collar provided by the wide face of a first bevel pinion 7 or 7' of a bevel gear train having helical teeth and constituting a first reduction stage 6 or 6'. The first bevel pinion 7 or 7' meshes with a second bevel pinion 8 or 8' of the reduction stage 6 or 6', the second bevel pinion 8 or 8' being in fact a bevel gearwheel having a vertical axis integral in rotation with the bottom end of a vertical transmission shaft 9 or 9'. At its top end the vertical shaft 9 or 9' is likewise integral in rotation with a cylindrical pinion 11 or 11' having helical teeth, which is the input pinion to a gear train forming a second reduction stage 10 or 10' comprising a gearwheel or adding gearwheel 12 having helical teeth with which each of the two pinions 11 and 11' meshes. The gearwheel 12 is thus a gearwheel which is common to the two main kinematic chains and to which the sum of the power delivered by the two engines is transmitted. The common adding gearwheel 12 is integral in rotation with the bottom end of a central vertical transmission shaft 13, the top end of which drives in rotation a cylindrical sun gear 15 having straight teeth, of an epicyclic gear train 14 which forms an output reduction stage of the main transmission gearbox. This epicyclic output stage 14 likewise comprises cylindrical planetary pinions 16 having straight teeth, which are distributed uniformly round the sun gear 15 and which are each in mesh with the latter and with an outer cylindrical ring 17 having internal straight teeth. In a manner well known in itself, the pinions 16 are mounted in rotation, each about its own lengthwise axis, upon a common planetary cage (not shown) which is integral in rotation with the bottom end of a vertical shaft 18 which is the driving shaft of the lifting rotor of the helicopter and is coaxial with the sun gear 15, with the vertical transmission shaft 13 and with the common adding gearwheel 12, and to which a heavy torque may be transmitted because of the presence of the epicyclic reduction stage 14.

The two main kinematic chains are coupled together at the level of their input stage by a third or coupling chain consisting of a cylindrical gear train 19 having helical teeth. This third chain 19 comprises the two pinions 2 and 2' and an intermediate pinion 20, arranged between the pinions 2 and 2' and in mesh with both of them. Further, the intermediate pinion 20 is integral in rotation with the front end of a horizontal auxiliary transmission shaft 21 which constitutes the shaft for the transmission of the torque towards the anti-torque rotor mounted at the rear of the helicopter. Consequently, the intermediate pinion 20 forms the output pinion from an auxiliary kinematic chain which transmits to the anit-torque rotor a fraction of the torque available at the input shafts 1 and 1' to the two main kinematic chains, and each of the two pinions 2 and 2' forms one pinion of the third chain 19 which ensures the sharing over the two main kinematic chains and over the auxiliary kinematic chain, of the power delivered by only one engine when the other engine has broken down. As the group of the two main kinematic chains is closed by the third chain 19 which forms with the two input shafts 1 and 1', the input stage to the main transmission gearbox, the device becomes hyperstatic. Hence it is necessary to introduce a certain flexibility in torsion in the connections in order to ensure satisfactory distribution of the loads and at the same time to effect an adjustment which ensures simultaneous meshing in the levels of the several pinions which are in mesh with one another.

The flexibility in torsion which is necessary for satisfactory distribution of the loads is provided by the twistable shafts 3 and 3', each of which is mounted between the corresponding input pinion 2 or 2' of the third chain 19 upstream and corresponding bevel pinion 7 or 7' of the first reduction stage 6 or 6' downstream.

The adjustment of the simultaneous meshing is ensured by the superimposition of a coarse adjustment and a fine adjustment. The coarse adjustment is obtained thanks to the angular offset which exists between the splines 4 or 4' on the upstream end of the twistable shafts 3 and 3' and the splines 5 or 5' on the downstream end of the latter, this angular offset resulting from the different numbers of the splines 4 or 4' and 5 or 5'. The fine adjustment is ensured by tightening of one of the input pinions 2 and 2' to the third chain 19 after displacement of this pinion 2 or 2' along its axis. That is, as the teeth of this pinion 2 or 2' are helical, an axial displacement of this pinion leads to a lead or lag in phase in the contact between the teeth, depending upon the direction of the axial displacement, and through this accurate adjustment the teeth may be brought simultaneously into contact with one another. The accurate axial positioning of the pinion 2 or 2' is obtained, for example, in a simple manner by putting in place at least one wedge between, on the one hand, a flange supporting the housing of the bearings against which bears the corresponding input shaft 1 or 1' and on the other hand the casing in which are housed the input shaft and the bearings.

Thus in a main transmission gearbox having this configuration and equipping a twin-engined helicopter the total mass of which is about 4,000 kg, in which each engine delivers a maximum continuous power of 500 kW, one obtains:

in operation on two engines, a distribution of a little less than 500 kW in each of the main kinematic chains and hence a power slightly less than 1,000 kW at the shaft 18 of the main rotor, the remainder of the power delivered by the engines serving to drive the anti-torque rotor and accessories (not shown) such as alternators, hydraluic pumps, a rotor brake, etc. . . . ;

in single-engined operation and taking into account that the sharing of power ensured by the third chain 10 is effected, so that two thirds are in the main kinematic chain coupled to the motor in operation and the remaining third in the main kinematic chain associated with the motor which has broken down, with a maximum emergency power from the engine in operation which is 750 kW, the main kinematic chain coupled to the engine in operation receives a power of about 500 kW whilst the other main chain receives only about 250 kW, so that a power slightly less then 750 kW is transmitted to the main rotor, the remainder of the power delivered being transmitted as previously to the anti-torque rotor and to the accessories.

It is clear that in the absence of the third chain 19, the dimensioning of each main kinematic chain would have to be ensured in order that it could transmit a maximum power of 750 kW and not 500 kW, which would be highly penalizing from a weight point of view particularly in the area of the second reduction stage 10 or 10'.

For a rate of rotation of the output shafts from the engines and hence of the input shafts 1 and 1' of about 8,000 r.p.m., the reduction ratios at the levelss of the several stages of reduction are such that the shafts 9 and 9' have a rate of rotation of about 4,700 r.p.m. and that the shaft 18 of the main rotor revolves at about 320 r.p.m., the transmission shaft 21 to the anit-torque rotor revolving at about 4,000 r.p.m.

In this example it should be observed that the pinions 11 and 11' and the cylindrical gearwheel 12 may possibly have straight teeth and not helical teeth.

The main transmission gearbox shown diagrammatically in FIG. 2 exhibits numerous characteristics which are common with those of the transmission gearbox which is described above with reference to FIG. 1, so that the same reference numbers (possibly primed) are employed for designating the identical or similar components which are not described again in detail, the course of the description relating essentially to the two main differences exhibited by the construction of FIG. 2 compared to that of FIG. 1.

One important difference is that the main transmission gearbox of FIG. 2 does not include an epicyclic reduction stage. The rotor driving shaft (not shown) has its bottom end integral in rotation with the cylindrical central adding gearwheel 12' which has helical teeth and which is common to both main kinematic chains and is in mesh with cylindrical pinions 11 and 11' having helical teeth of the second reduction stage forming the output stage from the gearbox.

A central intermediate pinion 20' integral in rotation with the transmission shaft 21' to the anti-torque rotor is connected to each of the input pinions 2 and 2' by a lateral intermediate pinion 22 or 22' with which it is in mesh and which is in turn in mesh with corresponding input pinion 2 or 2'. Each of the two pinions 22 and 22' is integral in rotation with the rear end of a shaft 23 or 23' for driving an accessory (not shown) such as an alternator, a hydraulic pump or a rotor brake.

These shafts 23 and 23' extend in parallel with the rigid shafts 1, 1' and 21' and with the twistable shafts 3 and 3' and may be directed towards the engines or as shown in FIG. 2 in the opposite direction.

The supplementary intermediate pinions 22 and 22' employed for driving directly from one side or the other of the main transmission gearbox, housings of accessories and equipments all of which will continue to operate even in the event of breakdown of one engine, are equally useful for adapting the third chain to a relatively large distance between the two input shafts 1 and 1'; this distance may be imposed by the outer diameter of the engines.

Finally, in the case where the engines are not provided with a free wheel integrated into their output stage, each of the two input shafts 1 and 1' is coupled to the output shaft 24 or 24' of the corresponding engine by way of a freewheel 25 or 25' as shown in FIG. 2.

For a rate of rotation of the driving shafts 24 and 24', the input shafts 1 and 1' and the twistable shafts 3 and 3' of 6,000 r.p.m. the reduction ratios of the first reduction stages 6 and 6' and the second reduction stages 10 and 10' of the two main kinematic chains as well as of the gear train of the third chain 19' are such that the vertical shafts 9 and 9' are driven at a speed of rotation of about 1,500 r.p.m. the driving shaft of the main rotor revolving at about 350 r.p.m. whilst the transmission shaft 21' to the anti-torque rotor revolves about 4,000 r.p.m.

In this example as in the previous one, the flexibility in torsion is introduced by the twistable shafts 3 and 3' having different numbers of splines at opposite ends in order to enable coarse adjustment of the simultaneous meshing, the fine adjustment being likewise ensured by tightening one of the pinions 2 and 2' having helical teeth, after a suitable axial displacement of this pinion.

I claim:

1. A main transmission gearbox for a helicopter having a lifting rotor, an anti-torque rotor and two engines each of which has an output shaft, said gearbox comprising:
a vertical driving shaft for coupling to said lifting rotor, two main kinematic chains for coupling the respective engines to the vertical driving shaft, each main kinematic chain comprising an input stage having an input shaft arranged to be driven in rotation by the output shaft of the associated engine, a first reduction stage having a first transmission shaft driven in rotation by said input shaft, a first bevel pinion driven by said first transmission shaft, a second bevel pinion meshing with said first bevel pinion and a second transmission shaft driven by said second bevel pinion, and a second reduction stage including a third pinion driven by said second transmission shaft and a gearwheel which meshes with said third pinions of both of said main kinematic chains and which is coupled to said vertical driving shaft and a third kinematic chain comprising a train of gears further coupling the two main kinematic chains together, said train of gears comprising an input pinion mounted on and for rotation with said input shaft of each main kinematic chain and at least one intermediate pinion disposed between and in geared connection with said input pinions to couple said input pinions together, each of said first transmission shafts extending between said first bevel pinioin and said input pinion and being flexible in a torsion, said at least one intermediate pinion directly driving a drive shaft of said anti-torque rotor.

2. A main transmission gearbox as in claim 1, wherein the two input pinions and at least one intermediate pinion of said third kinematic chain are cylindrical pinions having helical teeth.

3. A main transmission gearbox as in claim 1, wherein said third kinematic chain includes a single said intermediate pinion meshing with each of the two input pinions and located substantially between them.

4. A main transmission gearbox as in claim 3, comprising two further intermediate pinions which mesh with the first said intermediate pinion and which mesh with the two input pinions respectively, whereby said first intermediate pinion is in geared connection with said input pinions, said further intermediate pinions being adapted to drive respective accessories.

5. A main transmission gearbox as in claim 2, wherein at least one of the two helical-tooth input pinions is adjustably movable lengthwise of its axis of rotation in order to ensure simultaneity of meshing of the teeth on all of the pinions of the third chain.

6. A main transmission gearbox for a helicopter having a lifting rotor, an anti-torque rotor and two engines each of which has an output shaft, said gearbox comprising:
a vertical driving shaft for coupling to said lifting rotor, two main kinematic chains for coupling the respective engines to the vertical driving shaft, each main kinematic chain comprising an input stage having an input shaft arranged to be driven in rotation by the output shaft of the associated engine, a first reduction stage having a first transmission shaft driven in rotation by said input shaft, a first bevel pinion driven by said first transmission shaft, a second bevel pinion meshing with said first bevel pinion and a second transmission shaft driven by said second bevel pinion, and a second reduction stage including a third pinion driven by said second transmission shaft and a gearwheel which meshes with said third pinions of both of said main kinematic chains and which is coupled to said vertical driving shaft, at least one of the two first transmission shafts being provided with splines at each of its ends, the splines formed at one end being angularly offset with respect to the splines formed at the other end, and a third kinematic chain comprising a train of gears further coupling the two main kinematic chains together, said train of gears comprising an input pinion mounted on and for rotation with said input shaft of each main kinematic chain and at least one intermediate pinion disposed between and in geared connection with said input pinions to couple said input pinions together, each of said first transmission shafts extending between said first bevel pinion and said input pinion and being flexible in torsion.

7. A main transmission gearbox as in claim 6, wherein the two input pinions and the intermediate pinion or pinions of said third kinematic chain are cylindrical pinions having helical teeth.

8. A main transmission gearbox as in claim 6, wherein said third kinematic chain includes a single said intermediate pinion meshing with each of the two input pinions and located substantially between them, this pinion being adapted to drive the anti-torque rotor.

9. A main transmission gearbox as in claim 8, comprising two further intermediate pinions which mesh with the first said intermediate pinion and which mesh with the two input pinions respectively, whereby said first intermediate pinion is in geared connection with said input pinions, said further intermediate pinions being adapted to drive respective accessories.

10. A main transmission gearbox as in claim 7, wherein at least one of the two helical-tooth input pinions is adjustably moveable lengthwise of its axis of rotation in order to ensure simultaneity of meshing of the teeth on all of the pinions of the third chain.

11. A main transmission gearbox for a helicopter having a lifting rotor, an anti-torque rotor and two engines each of which has an output shaft, said gearbox comprising:

a vertical driving shaft for coupling to said lifting rotor, two main kinematic chains for coupling the respective engines to the vertical driving shaft, each main kinematic chain comprising an input stage having an input shaft arranged to be driven in rotation by the output shaft of the associated engine, a first reduction stage having a first transmission shaft driven in rotation by said input shaft, a first bevel pinion driven by said first transmission shaft, a second bevel pinion meshing with said first bevel pinion and a second transmission shaft driven by said second bevel pinion, and a second reduction stage including a third pinion driven by said second transmission shaft and a gearwheel which meshes with said third pinions of both of said main kinematic chains and which is coupled to said vertical driving shaft, at least one of the two first transmission shafts being provided with a number of splines at each of its ends, the number of splines at said ends being unequal, and a third kinematic chain comprising a train of gears further coupling the two main kinematic chains together, said train of gears comprising an input pinion mounted on and for rotation with said input shaft of each main kinematic chain and at least one intermediate pinion disposed between and in geared connection with said input pinions to couple said input pinions together, each of said first transmission shafts extending between said first bevel pinion and said input pinion and being flexible in torsion.

12. A main transmission gearbox as in claim 11, wherein the two input pinions and the intermediate pinion or pinions of said third kinematic chain are cylindrical pinions having helical teeth.

13. A main transmission gearbox as in claim 11, wherein said third kinematic chain includes a single said intermediate pinion meshing with each of the two input pinions and located substantially between them, this pinion being adapted to drive the anti-torque rotor.

14. A main transmission gearbox as in claim 13, comprising two further intermediate pinions which mesh with the first said intermediate pinion and which mesh with the two input pinions respectively, whereby said first intermediate pinion is in geared connection with said input pinions, said further intermediate pinions being adapted to drive respective accessories.

15. A main transmission gearbox as in claim 12, wherein at least one of the two helical-tooth input pinions is adjustably movable lengthwise of its axis of rotation in order to ensure simultaneity of meshing of the teeth on all of the pinions of the third chain.

* * * * *